(12) United States Patent
Moriyama et al.

(10) Patent No.: US 6,944,872 B2
(45) Date of Patent: Sep. 13, 2005

(54) DISK RECORDING OR PLAYBACK DEVICE AND PROCESS FOR ASSEMBLING THE DEVICE IN WHICH A HOLDING MECHANISM PIVOTALLY SUPPORTS THE FRAME DURING AN OBLIQUE INSERTION OPERATION

(75) Inventors: Masahiro Moriyama, Osaka (JP); Yasuo Yanase, Osaka (JP); Tadashi Inoue, Neyagawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 202 days.

(21) Appl. No.: 10/271,570

(22) Filed: Oct. 17, 2002

(65) Prior Publication Data

US 2003/0076773 A1 Apr. 24, 2003

(30) Foreign Application Priority Data

Oct. 19, 2001 (JP) ........................................ 2001-321325

(51) Int. Cl.⁷ ................................................ G11B 7/08
(52) U.S. Cl. ...................................................... 720/690
(58) Field of Search .......................... 720/690; 369/263, 369/75.2

(56) References Cited

U.S. PATENT DOCUMENTS

| | | | | |
|---|---|---|---|---|
| 4,654,840 A | * | 3/1987 | Takahashi | 369/75.2 |
| 4,680,748 A | * | 7/1987 | Kobayashi | 369/77.1 |
| 5,128,918 A | * | 7/1992 | Suzuki et al. | 369/77.1 |
| 5,528,442 A | * | 6/1996 | Hisatomi | 369/191 |
| 5,583,839 A | * | 12/1996 | Choi | 369/75.2 |
| 5,781,523 A | * | 7/1998 | Ozawa et al. | 369/75.1 |
| 5,812,510 A | * | 9/1998 | Son | 369/75.1 |
| 6,246,643 B1 | * | 6/2001 | Satoh et al. | 369/30.85 |

FOREIGN PATENT DOCUMENTS

| | | |
|---|---|---|
| EP | 0 450 528 A2 | 10/1991 |
| EP | 0 518 259 A2 | 12/1992 |
| JP | 02 134760 A | 5/1990 |
| JP | 10 334553 A | 12/1998 |

* cited by examiner

*Primary Examiner*—David Davis
(74) *Attorney, Agent, or Firm*—Armstrong, Kratz, Quintos, Hanson & Brooks, LLP

(57) ABSTRACT

A mechanism deck provided with a turntable for rotating a disk and movable upward or downward as coupled to a slide member comprises a subchassis having the turntable mounted thereon, and a frame fitting to the slide member and supporting the subchassis. The chassis is provided with a holding mechanism for upwardly or downwardly pivotally movably supporting the frame as fitted to the slide member through a space between the clamp support plate and the chassis. The frame is provided with a pin projecting outward therefrom and supported by the holding mechanism for restraining the frame from backlashing upward or downward, and the projecting pin has a projection for preventing the frame from backlashing laterally.

6 Claims, 23 Drawing Sheets

DISK RECORDING OR PLAYBACK DEVICE AND PROCESS FOR ASSEMBLING THE DEVICE IN WHICH A HOLDING MECHANISM PIVOTALLY SUPPORTS THE FRAME DURING AN OBLIQUE INSERTION OPERATION

FIELD OF THE INVENTION

The present invention relates to disk recording or playback devices and a process for assembling the device.

DESCRIPTION OF THE RELATED ART

FIG. 23 is a perspective view of a disk recording or playback device previously proposed by the present applicant and as partly modified (see the publication of Japanese Patent No. 2630848), and FIG. 24 is a plan view of a conventional chassis 1. In the following description, the direction in which the disk is drawn into the chassis 1 will be referred to as "forward," and the direction in which the disk is discharged from the chassis 1 as "rearward."

Provided on the chassis 1 are a mechanism deck 5 for reproducing signals from a disk D, a slide member 3 coupled to the deck 5 and movable laterally, and a drive gear 10 coupled to a motor (not shown). A tray 4 for placing the disk D thereon is provided over the mechanism deck 5 and the slide member 3. The tray 4 is in mesh with the drive gear 10 and movable forward or rearward. As is already known, the tray 4 has a large recessed wall 44 for placing a large disk thereon and a small recessed wall 45 for placing a small disk thereon.

Disposed above the tray 4 on the chassis 1 is a clamp 51 for holding the disk D to a turntable 51 for rotating the disk D. The clamp 8 is attached to a clamp support plate 11 removably positionable over the chassis 1.

As shown in FIG. 24, the mechanism deck 5 has mounted on a subchassis 50 the turntable 51 and a pickup 52 movable toward or away from the turntable 51 for projecting a beam from an objective 53 onto the rear surface of the disk D. The pickup 52 is movable along guide rods 54, 54 mounted on the upper surface of the subchassis 50. The beam from the pickup 52 impinges on the disk rear surface through an opening 40 formed in the tray 4. The subchassis 50 is supported by a pivot 56 on the chassis 1 and is movable upward or downward.

Pins 39 projecting from the upper surface of the slide member 3 fit in a cam portion (not shown) provided on the tray 4. As shown in FIG. 25, the slide member 3 is provided at its front end with a vertical plate 31, which has a cam groove 36. A cam follower 55 projecting from the subchassis 50 fits in the cam groove 36. The cam groove 36 has an open upper end. When the mechanism deck 5 is to be mounted on the chassis 1, the cam follower 55 fits into the cam groove 36 from above.

The tray 4 in mesh with the drive gear 10 is driven forward or rearward, and the slide member 3 fitting to the cam portion of the tray 4 moves laterally. With the tray 4 retracted completely, the mechanism deck 5 has its rear end lowered, as shown in FIG. 26A. With a rightward movement of the slide member 3, the mechanism deck 5 is raised to a horizontal position, as seen in FIG. 26B. The disk D is held between the turntable 51 and the clamp 8.

However, the conventional device still remains to be improved as will be described below.

When the mechanism deck 5 is to be mounted on the chassis 1, the clamp support plate 11 is removed first, the deck 5 is then inserted into the chassis 1 from above, and the cam follower 55 of the deck 5 is fitted into the cam groove 36 from above.

Accordingly, it takes some time to manually remove the clamp support plate 11.

Because the cam groove 36 has an open end, the cam follower 55 will be disengaged from the cam groove 36 when the chassis 1 is subjected to an impact from the outside after the mechanism deck 5 has been mounted in place, entailing the likelihood that the deck 5 will not move upward or downward properly.

An object of the present invention is to render the mechanism deck mountable with an improved work efficiency. Another object of the invention is to make it possible to move the mechanism deck upward or downward properly even when the deck is subjected to an impact from the outside.

SUMMARY OF THE INVENTION

A mechanism deck 5 provided with a turntable 51 and movable upward or downward as coupled to a slide member 3 comprises a subchassis 50 having the turntable 51 mounted thereon, and a frame 6 fitting to the slide member 3 and supporting the subchassis 50.

The chassis 1 is provided with a holding mechanism for upwardly or downwardly pivotally movably supporting the frame 6 as inserted into the chassis 1 obliquely from above and fitting to the slide member 3.

The frame 6 is provided with a pin 60 projecting outward therefrom and supported by the holding mechanism for restraining the frame 6 from backlashing upward or downward, and the projecting pin 60 has a projection 61 for preventing the frame 6 from backlashing laterally.

To mount the mechanism deck 5 on the chassis 1, the deck 5 is first inserted into the chassis 1 obliquely from above, with the frame 6 facing toward the slide member 3. The holding mechanism on the chassis 1 is then caused to support the frame 6 upwardly or downwardly pivotally movably. The frame 6 as thus supported is fitted to the slide member 3 by pushing in, whereby the deck 5 is completely mounted in place. The frame 6 is pivotally movable upward or downward as supported by the chassis 1 and is therefore movable upward or downward with the movement of the slide member 3.

According to the present invention, the mechanism deck 5 can be mounted on the chassis 1, with a clamp support plate 11 attached to the chassis 1, and is therefore mountable with an improved work efficiency. Because the projecting pin 60 is supported by the holding mechanism to restrain the frame 6 from backlashing upward or downward, the mechanism deck 5 is unlikely to be removed from the slide member 3 and the chassis 1 even when subjected to an impact from the outside. Accordingly, the mechanism deck 5 is movable upward or downward properly.

DESCRIPTION OF THE PREFERRED EMBODIMENTS

Embodiments of the present invention will be described below in detail with reference to the drawings.

Figure 1:
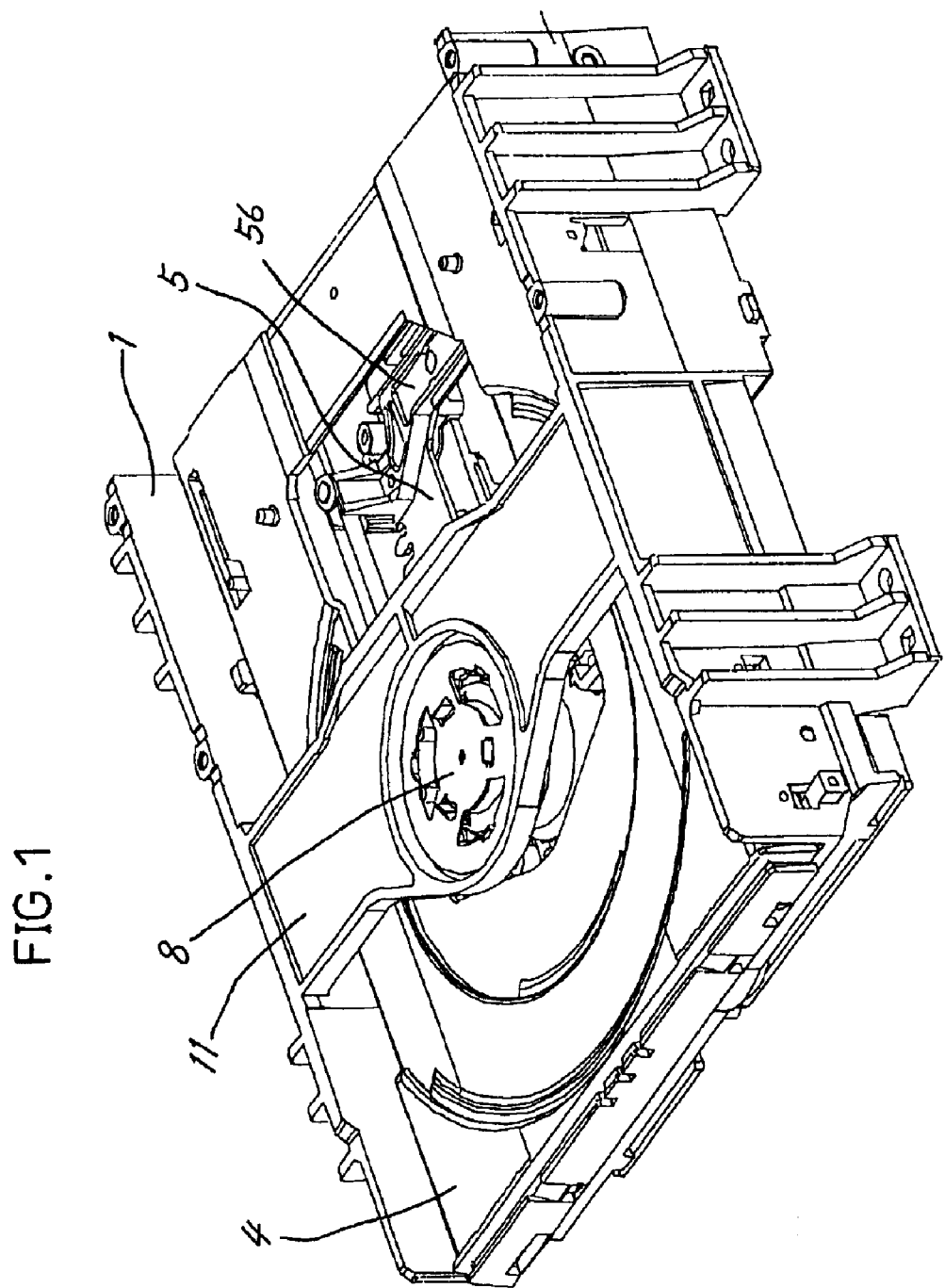
FIG. 1 is a perspective view of a device with a tray advanced completely.
Figure 2:
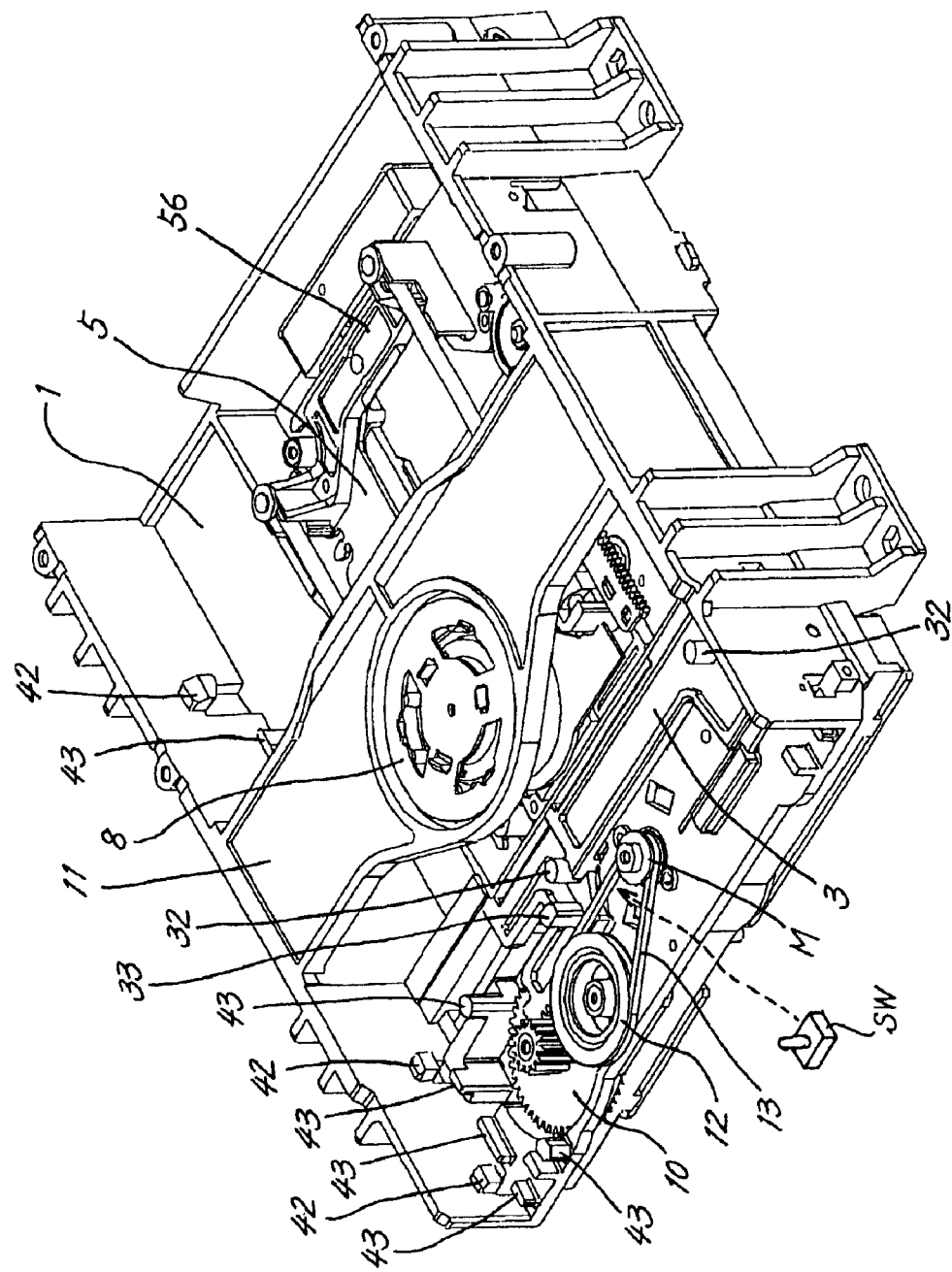
FIG. 2 is a perspective view of the device with the tray omitted.
Figure 3:
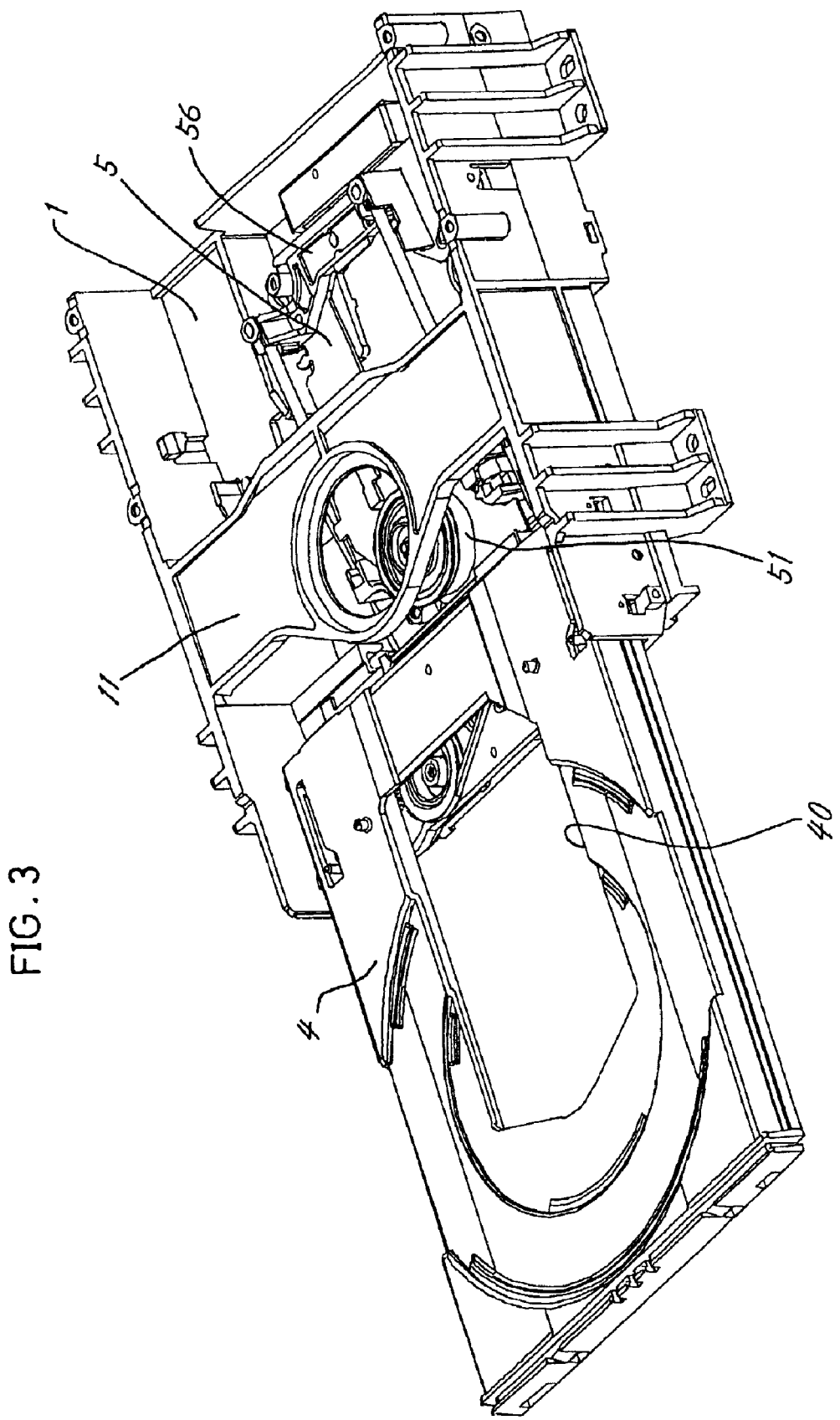
FIG. 3 is a perspective view of the device with the tray retracted completely.

FIG. 1 is a perspective view of a device wherein a tray 4 has been advanced completely, and FIG. 2 is a perspective view of the device with the tray 4 omitted. FIG. 3 is a perspective view of the device wherein the tray 4 has been retracted completely, the view not showing the clamp 8 to be described later. As in the prior art, a mechanism deck 5 has a turntable 51 and a pickup 52 and is movable upward and downward about a pivot 56 on a chassis 1. A clamp support plate 11 positioned above the tray 4 is integral with the chassis 1. A clamp 8 for holding a disk between the turntable 51 and the clamp 8 is attached to the support plate 11 so as to be movable upward or downward by a very small amount. The construction of the clamp 8 is well known.

Provided between the clamp support plate 11 and the chassis 1 is a space K (see FIG. 11) for inserting the mechanism deck 5 thereinto obliquely from above. Mounted on the chassis 1 is a drive gear 10 which is rotated by a motor M by way of an intermediate pulley 12 and a belt 13. The drive gear 10 is in mesh with the tray 4 as will be described later.

Upper support members 42, 42 and lower support members 43, 43 are arranged at each of opposite sides of the chassis 1, and the tray 4 is fittingly provided between the upper support members 42, 42 and the lower support members 43, 43. Extending upward from a slide member 3 are two first projections 32, 32 which are spaced apart from each other and a second projection 33. The slide member 3 is movable laterally.

Figure 4:
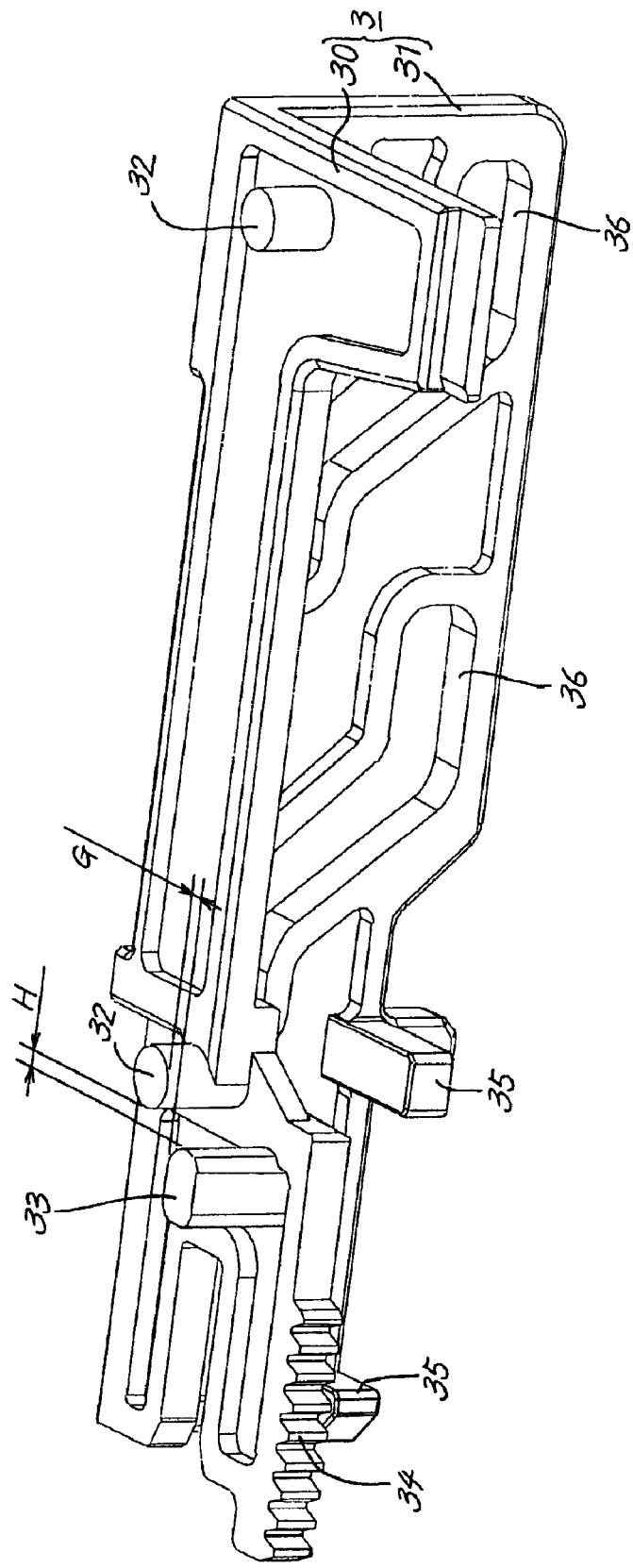
FIG. 4 is a perspective view of a slide member.

FIG. 4 is a perspective view of the slide member 3. The slide member 3 comprises a horizontal plate 30 and a vertical plate 31 extending downward from the front end of the horizontal plate 30. One of the first projections 32 and the second projection 33 are so positioned as to provide therebetween a clearance H in the lateral direction and a clearance G in the forward or rearward direction on the horizontal plate 30. A projecting wall 7 of the tray 4 fits into the clearance H or G as will be described later.

The horizontal plate 30 is provided with a rack 34 meshing with the drive gear 10, and two switch pushing protrusions 35, 35 positioned under the rack 34 and spaced apart from each other. These protrusions 35, 35 are positioned under the chassis 1 for pushing a sensor switch SW (see FIG. 2) attached to the bottom surface of the chassis 1.

The vertical plate 31 has cam grooves 36, 36 for cam followers 55, 55 on a subchassis 50 to fit in, such that when the slide member 3 is moved laterally, the mechanism deck 5 coupled to the member 3 at the cam grooves 36 is moved upward or downward. Each cam groove 36 has a closed upper end unlike the conventional one. One cam groove 36 or at least two cam grooves 36 may be provided.

Figure 5:
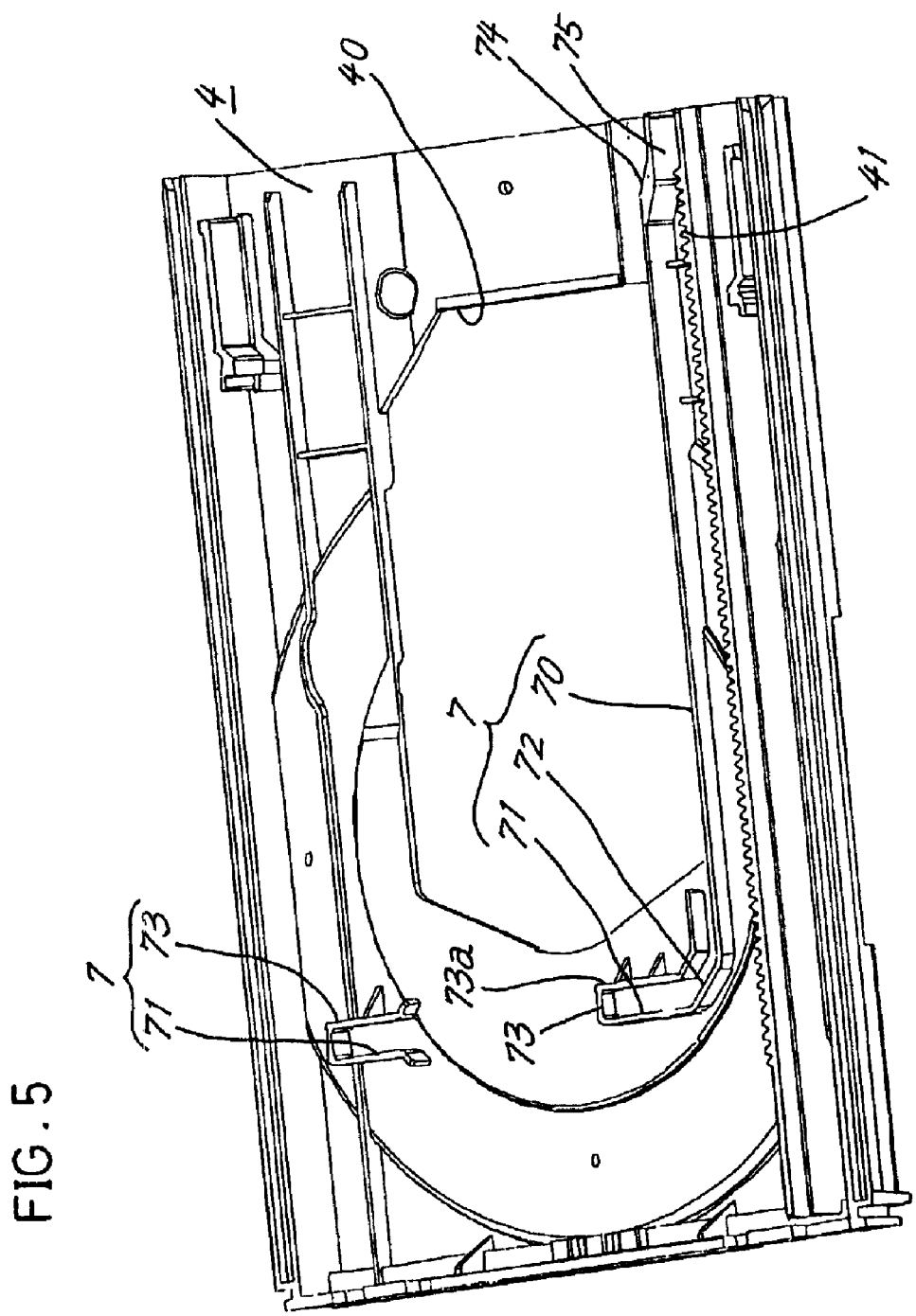
FIG. 5 is a perspective view of the tray as it is seen from below.

FIG. 5 is a perspective view of the tray 4 as it is seen from below. The tray 4 has two projecting walls 7, 7 at one side of an opening 40 therein. One of the walls 7 has a first wall 70 extending forward, an inclined wall 72 extending from the rear end of the first wall 70 and inwardly inclined toward the rear, and a second wall 71 integral with the rear end of the wall 72 and extending perpendicular to the first wall 70. The end of the second wall 71 opposite to the inclined wall 72 is closed with a cover wall 73 integral with the second wall 71. The first wall 70 has a front end portion providing an outwardly slanting cam wall 74, and a third wall 75 integral with the front end of the cam wall 74 and generally parallel to the first wall 70. The other projecting wall 7 comprises a second wall 71 and a cover wall 73 and has an inner open end. Positioned externally of the first wall 70 is a rack 41 extending forward or rearward and meshing with the drive gear 10.

Figure 26A:
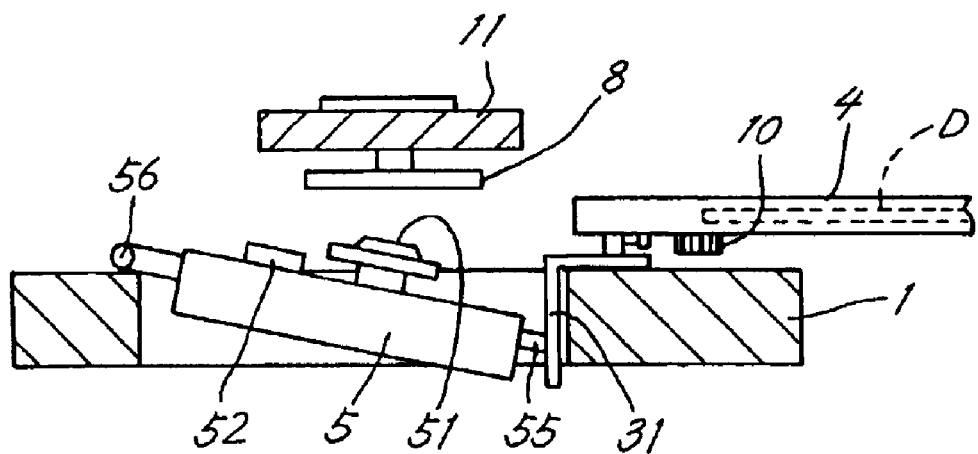
FIGS. 26A and 26B are views showing FIG. 23 in section along a plane containing the line D—D.
Figure 26B:
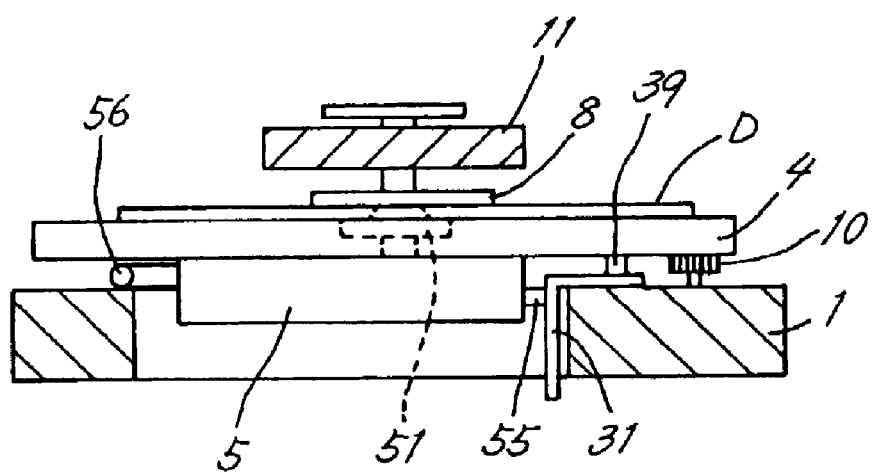

Signals can be recorded on or reproduced from a disk D with the tray 4 completely advanced. The mechanism deck 5 is moved upward to a horizontal position with the movement of the slide member 3 as in the prior art and as shown in FIG. 26B, causing the turntable 51 to raise the disk D for the turntable 51 and the clamp 8 to hold the disk D therebetween. A beam is projected from the pickup 52 on the rear surface of the disk through the opening of the tray 4.

Figure 6:
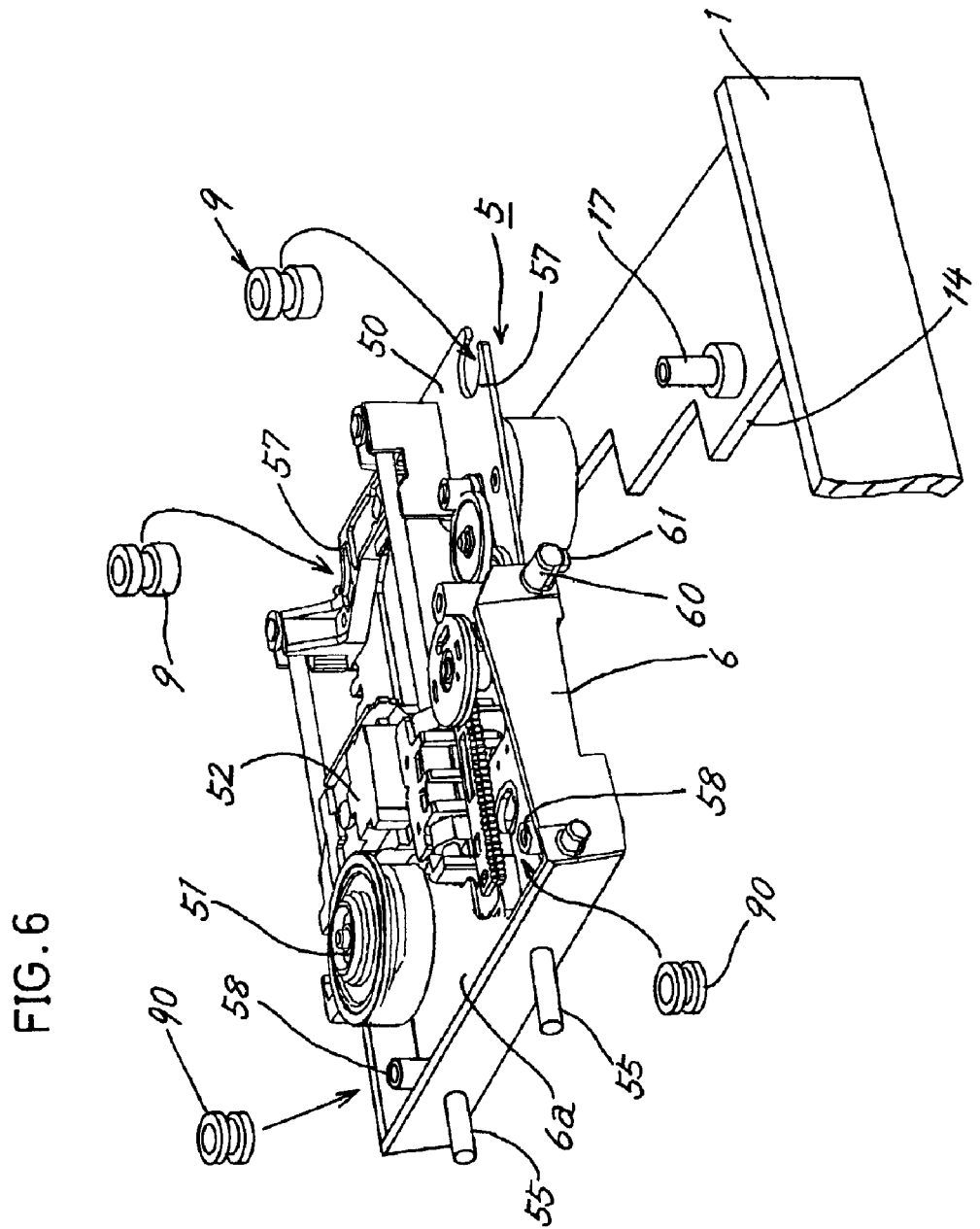
FIG. 6 is a perspective view of a mechanism deck.

FIG. 6 is a perspective view of the mechanism deck 5. The deck 5 comprises the subchassis 50 which is in the form of a flat plate and has the turntable 51 and the pickup 52 mounted thereon, and a frame 6 fitting to the slide member 3 and supporting the subchassis 50 pivotally movably in the manner to be described later.

The frame 6 has the aforementioned cam followers 55 projecting rearward, and a pin 60 projecting from the front end of each side wall thereof. The projecting pin 60 has a projection 61 projecting downward from the outer end thereof. As will be described later, the projecting pin 60 and the projection 61 serve to restrain the frame 6 respectively from backlashing upward or downward and from backlashing laterally.

The subchassis 50 has at the front end portion thereof cutouts 57 each having fitted therein a first hollow elastic member 9 made of rubber or the like. The chassis 1 has a boss 17, and the elastic member 9 is fittable around the boss 17.

The frame 6 has a bottom plate 6a, from which bosses 58 extend upward through the subchassis 50. A second hollow elastic member 90 is fitted around each boss 58.

Figure 7:
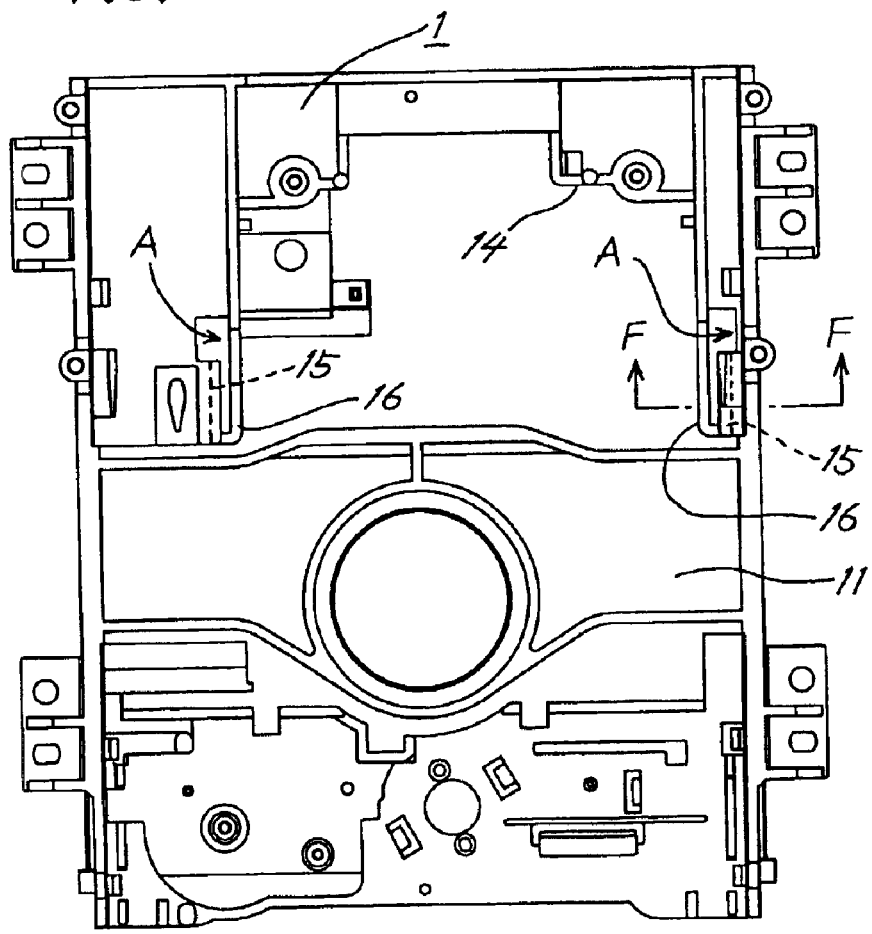
FIG. 7 is a plan view of a chassis.

FIG. 7 is a plan view of the chassis 1. The chassis 1 is made from a synthetic resin by injection molding and provided with the clamp support plate 11 integrally therewith. The chassis 1 has a large opening 14 in front of the clamp support plate 11. A holding piece 15 and a supporting piece 16 are arranged at each of opposite sides of the opening 14, and spaced apart from each other laterally and vertically.

Figure 8:
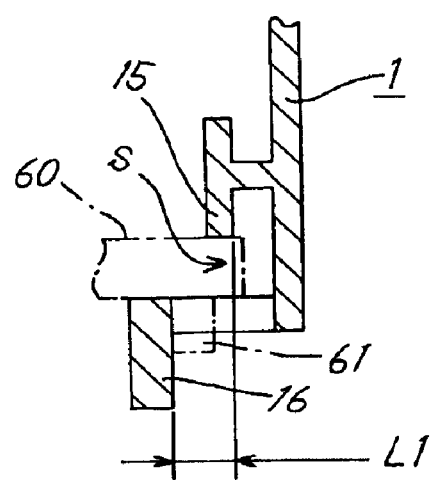
FIG. 8 is a view in section taken along a plane containing the line F—F in FIG. 7 and showing a holding piece and a supporting piece at the right.

FIG. 8 is a view in section taken along a plane containing the line F—F in FIG. 7 and showing the holding piece 15 and the supporting piece 16 at the right side. The projecting pin 60 of the frame 6 is fitted in a clearance S between these pieces 15, 16 with respect to the vertical direction. The frame 6 is restrained from shifting upward by the holding piece 15 and from shifting downward by the supporting piece 16. The holding piece 15 and the supporting piece 16 provide a holding mechanism for supporting the frame 6 on the chassis 1. The projection 61 is in contact with the right side face of the supporting piece 16, preventing the frame 6 and the mechanism deck 5 from shifting leftward. As described above, the holding piece 15 and the supporting piece 16 are provided also at the left end of the chassis 1. The frame 6 and the deck 5 are prevented from shifting rightward by the supporting piece 16 at the left end of the chassis 1.

Figure 9A:
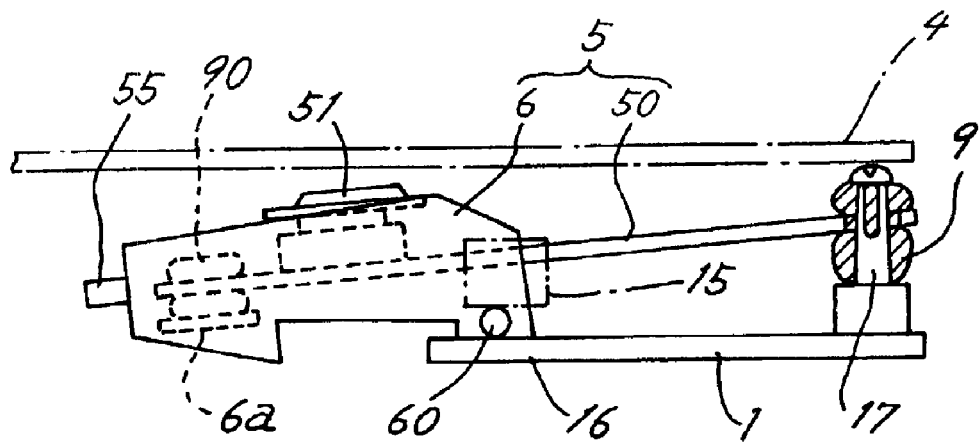
FIGS. 9A and 9B are side elevations of a frame and a subchassis.
Figure 9B:
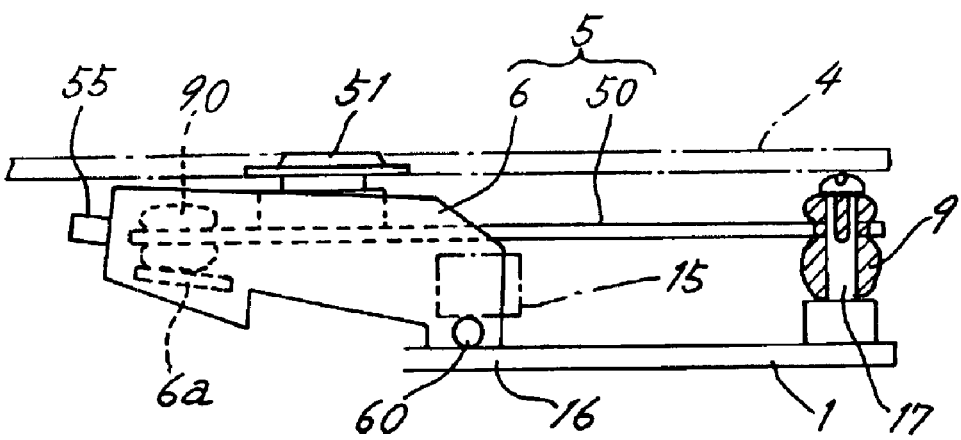

FIGS. 9A and 9B are side elevations of the frame 6 and the subchassis 50. The cam followers 55 of the frame 6 are fitted to the slide member 3, while the slide member 3 is not shown in FIGS. 9A and 9B.

When the frame 6 and the subchassis 50 are positioned as lowered about each first elastic member 9, the elastic member 9 is deformed by being pushed by the subchassis 50 as shown in FIG. 9A. The projecting pin 60 is held between the holding piece 15 and the supporting piece 16 and is restrained from backlashing upward or downward.

When the slide member 3 is moved to move the subchassis 50 upward to a substantially horizontal position as seen in FIG. 9B, the frame 6 turns clockwise about the projecting pin 60. The lower end portion of each second elastic member 90 is deformed by being pushed by the bottom plate 6a of the frame 6.

(Mounting the Mechanism Deck)

The mechanism deck 5 is mounted in place by the following procedure.

Figure 10:
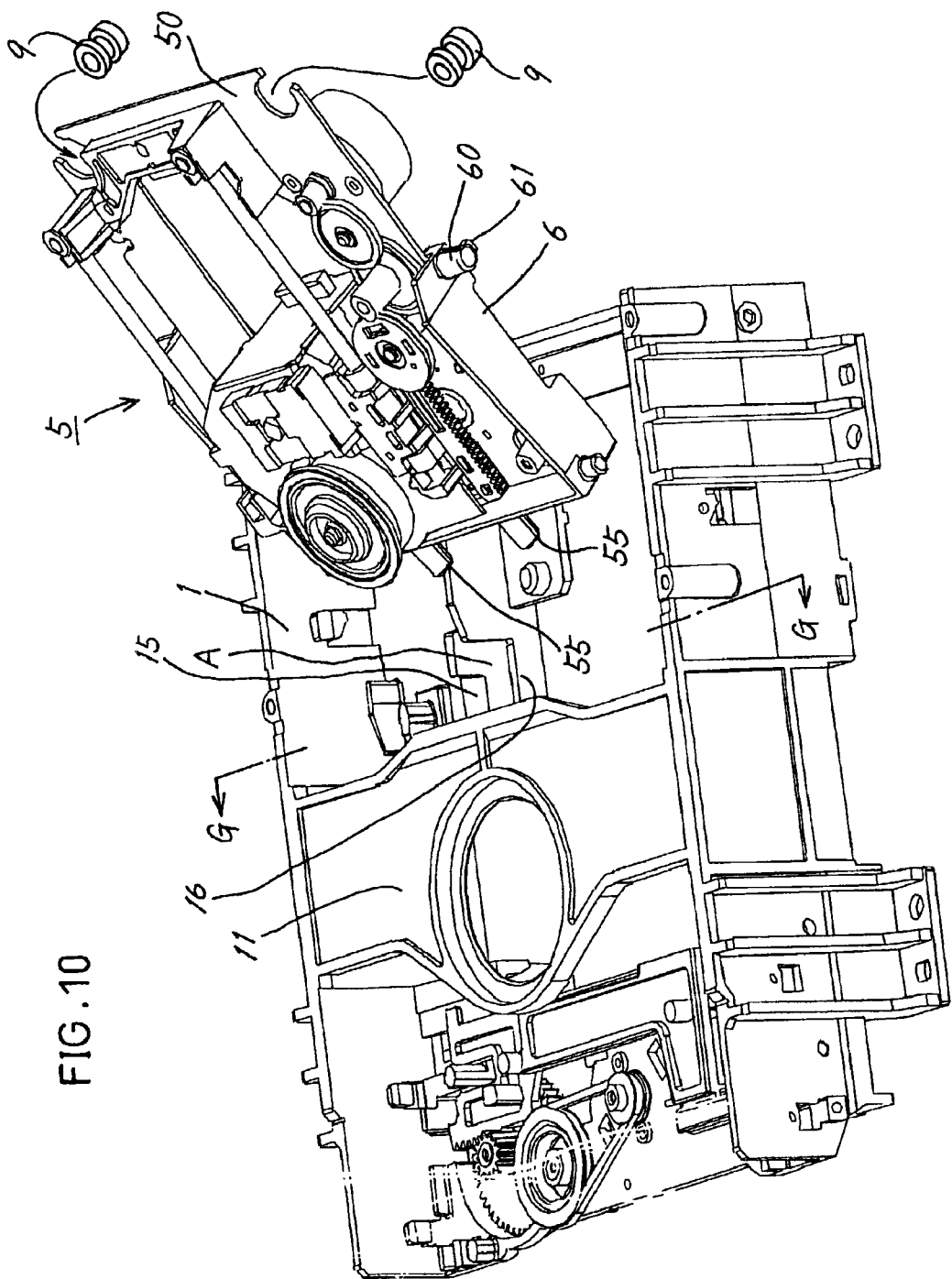
FIG. 10 is a perspective view showing how to mount the mechanism deck on the chassis.

First, one end of the mechanism deck 5 is grasped by hand. As shown in FIG. 10, the deck 5 is inserted into the space K (see FIG. 11) between the clamp support plate 11 and the chassis 1 obliquely from above, with the cam followers 55 of the frame 6 directed toward the slide member 3.

Figure 11:
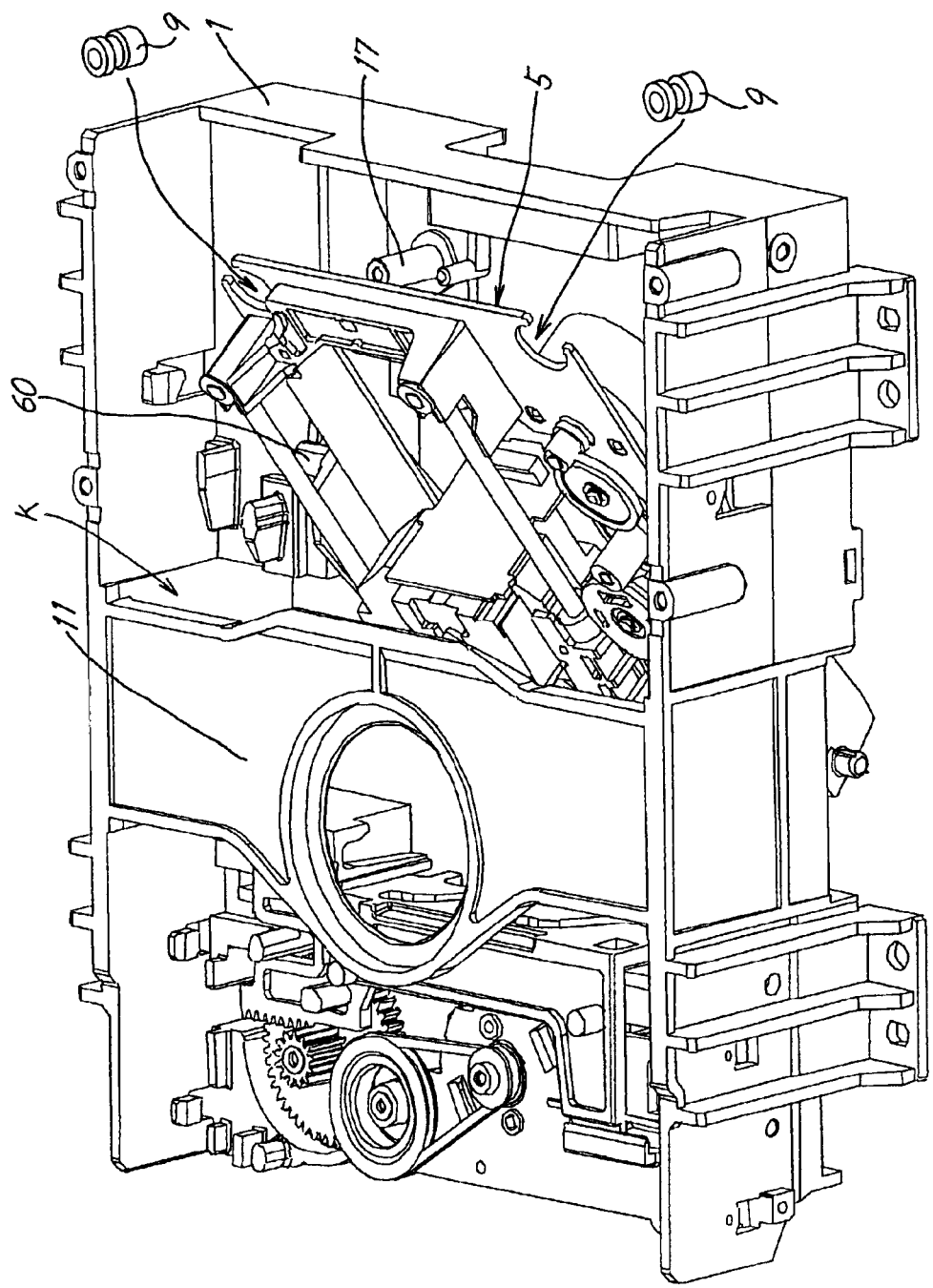
FIG. 11 is a perspective view showing how to mount the mechanism deck on the chassis.

As shown in FIG. 11, the mechanism deck 5 in this state is pushed into the space K to bring each projecting pin 60 to a position (point A in FIG. 10) in front of the holding piece 15. In this state, the cam followers 55 are positioned below the slide member 3 as shown in FIG. 12.

Figure 12:
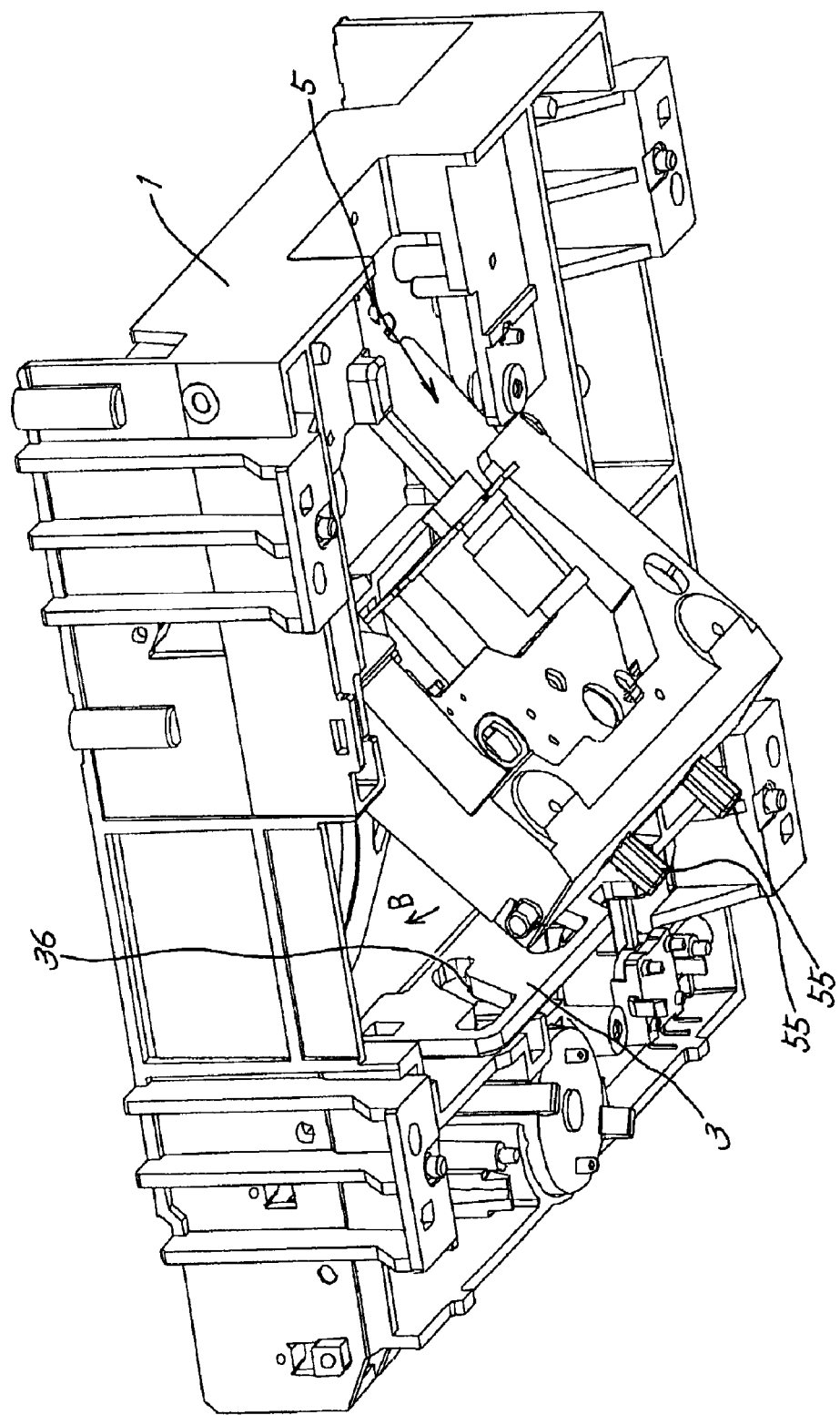
FIG. 12 is a perspective view showing how to mount the mechanism deck on the chassis when the deck is seen from the rear side of the chassis.

The deck 5 is manually turned about the projecting pin 60 in the direction of arrow B in FIG. 12 to bring the cam followers 55 closer to the slide member 3. Next, the mechanism deck 5 is pushed rearward to fit the projecting pin 60 of the frame 6 into the space between the holding piece 15 on the chassis 1 and the supporting piece 16 thereon, and to fit the cam followers 55 into the respective cam grooves 36 in the slide member 3. The first elastic members 9 of the mechanism deck 5 are fitted around the bosses 17 shown in FIG. 11, whereby the deck 5 is completely mounted on the chassis.

Figure 13:
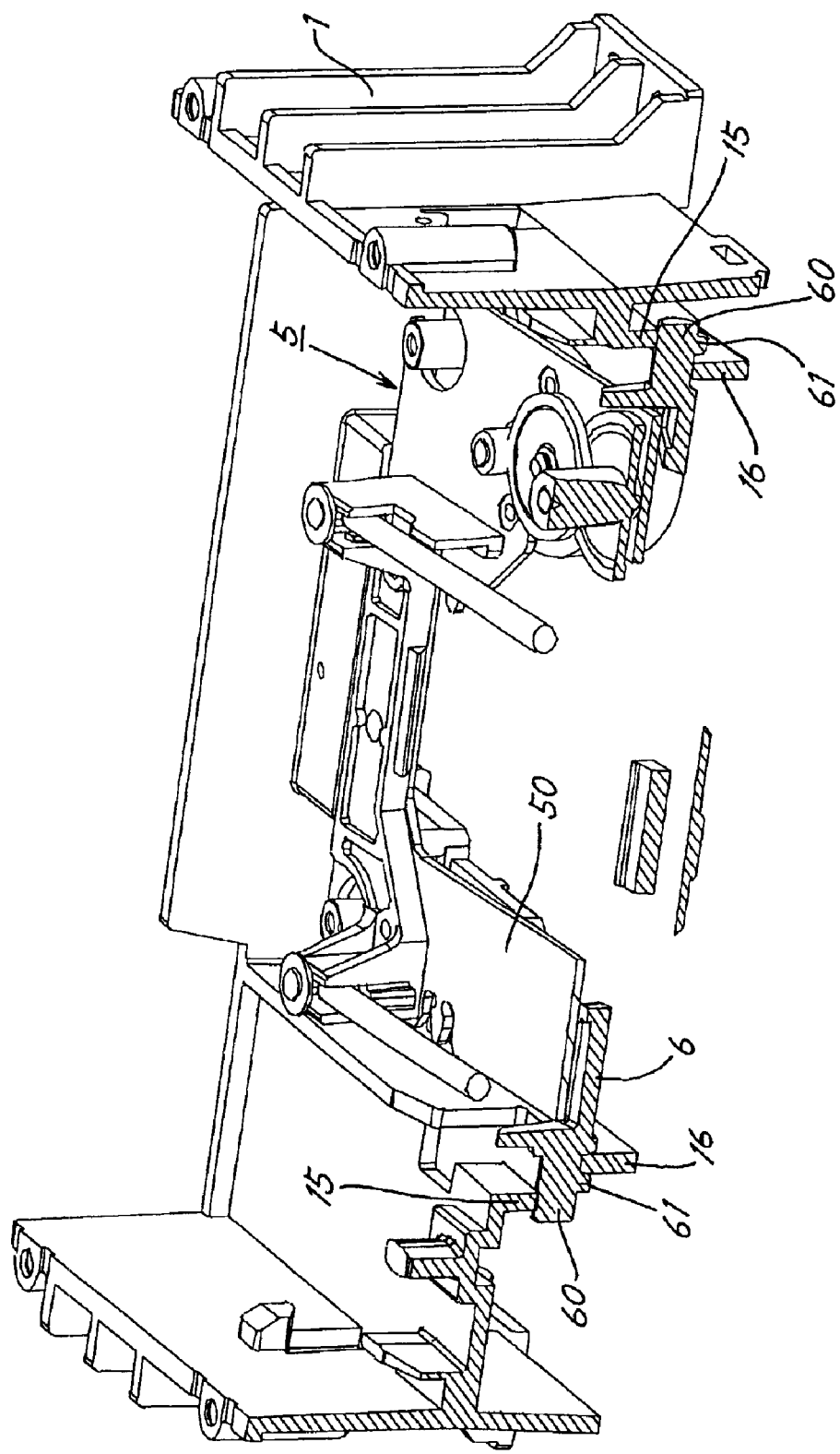
FIG. 13 is a view showing FIG. 10 in section along a plane containing the line G—G.

FIG. 13 is a view showing FIG. 10 in section along a plane containing the line G—G, with the first elastic members omitted. Each projecting pin 60 of the frame 6 has its upper end held in contact with the holding piece 115 and its lower end with the supporting piece 16 and is thereby prevented from backlashing upward or downward, and the frame 6 is supported so as to be pivotally movable about the pin 60. As previously stated, the projection 61 of the projecting pin 60 is in contact with the side face of the supporting piece 16, preventing the frame 6 and the mechanism deck 5 from shifting laterally.

Figure 23:
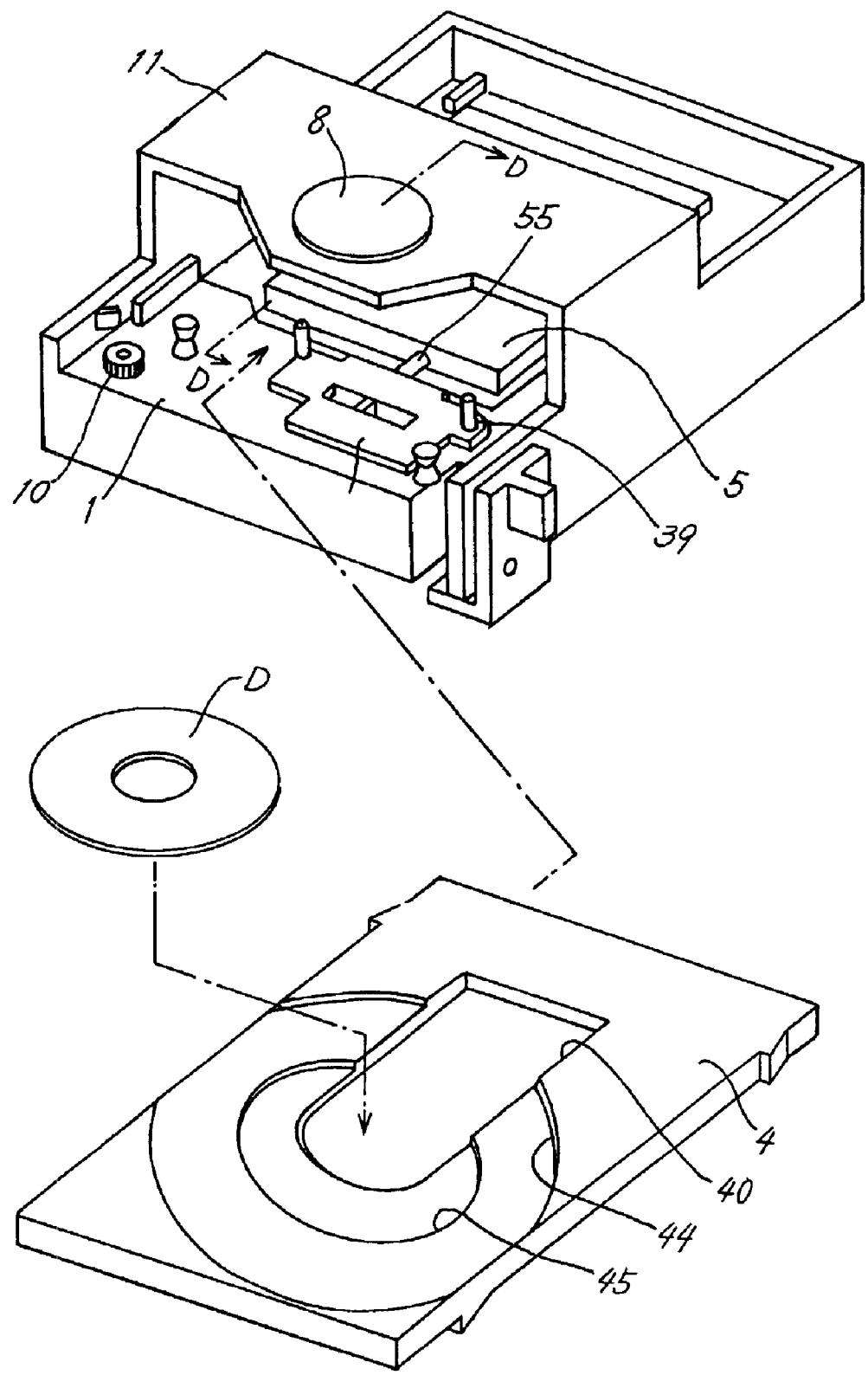
FIG. 23 is a perspective view of a conventional disk recording or playback device.
Figure 24:
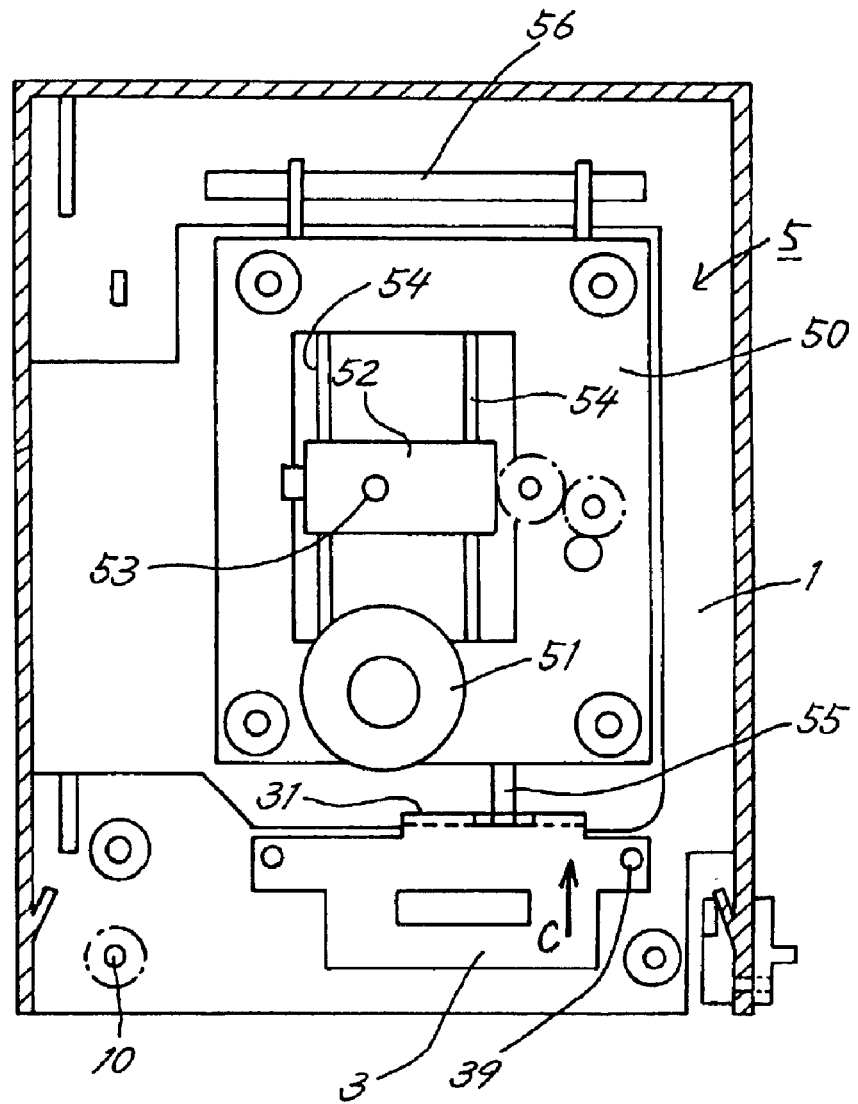
FIG. 24 is a plan view of a conventional chassis.
Figure 25:
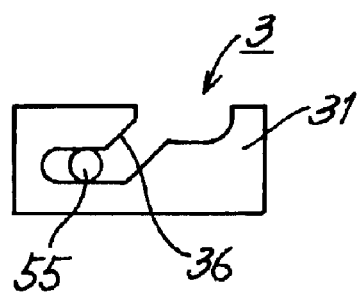
FIG. 25 is a view showing a slide member in FIG. 24 as it is seen from the direction C.

According to the construction of the present embodiment, the mechanism deck 5 can be mounted on the chassis 1, with the clamp support plate 11 provided on the chassis 1, hence an improved work efficiency. Further because the frame 6 is supported by the holding mechanism comprising a holding piece 15 and a supporting piece 16, the mechanism deck 5 is restrained form backlashing upward or downward unlike the conventional one shown in FIG. 23.

The cam follower 55 of the frame 6 is inserted into the cam groove 36 having a closed upper end. Accordingly, the mechanism deck 5 can be moved upward or downward properly without the likelihood of the deck being removed from the slide member 3 and the chassis 1 even if subjected to an impact from outside.

(Advance of the Tray)

The tray 4 as mounted on the chassis 1 is completely advanced in the manner to be described below. FIGS. 14 to 17 are plan views of the chassis 1 and the tray 4. The mechanism deck 5 is not shown for the convenience of illustration.

With the mechanism deck 5 mounted on the chassis 1, the tray 4 is fittingly placed from the rear in between the upper support members 42, 42 and the lower support members 43, 43 (see FIG. 2). At this time, the slide member 3 is brought to a position closest to the left end, with the third wall 75 of the tray 4 in contact with the first projection 32 on the slide member 3.

Figure 14:
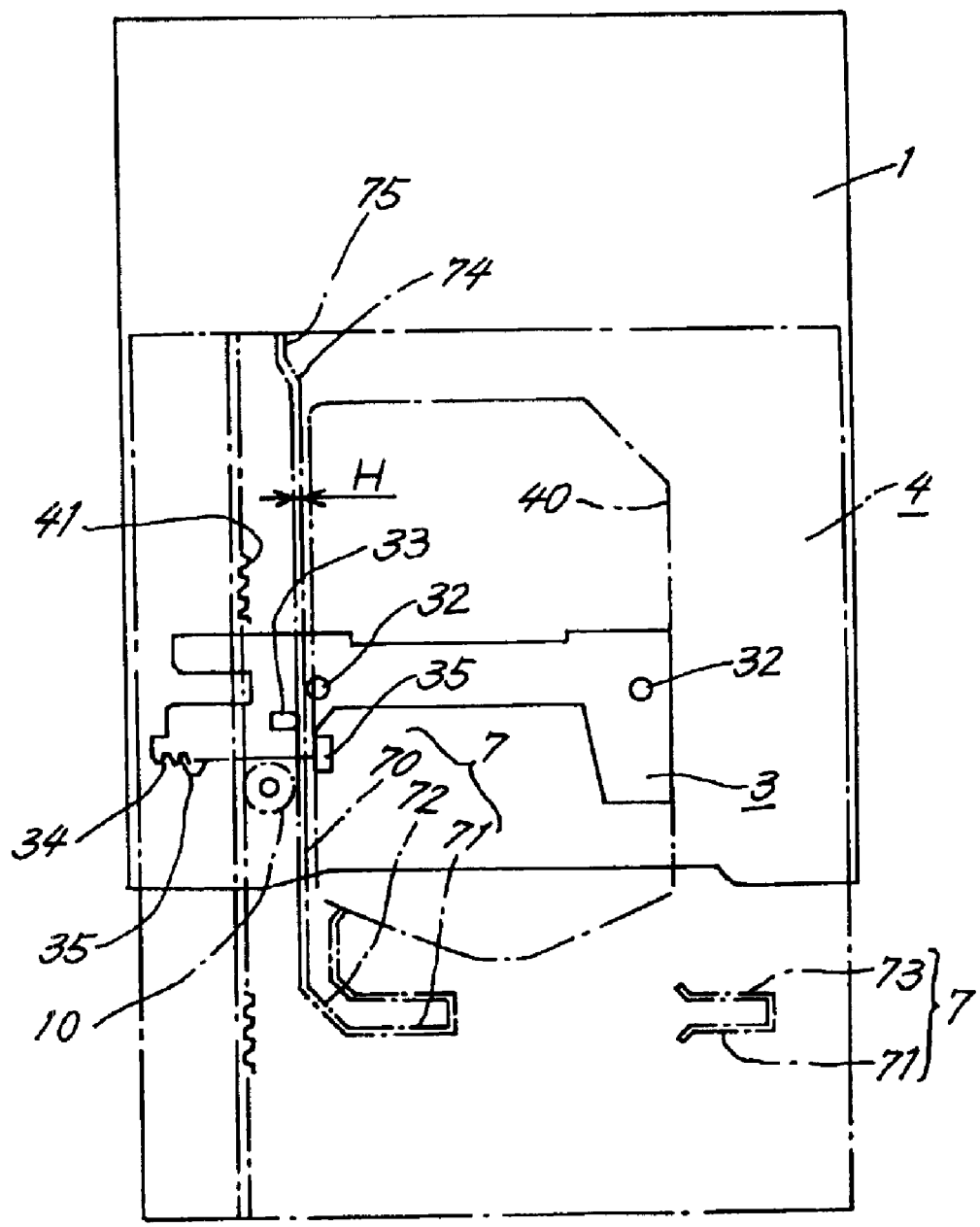
FIG. 14 is a plan view showing an advance movement of the tray.

When the drive gear 10 is rotated to advance the tray 4 by energizing the motor M, the tray 4 advances with the first wall 70 fitted in the clearance H between the first projection 32 and the second projection 33 as shown in FIG. 14. This prevents the slide member 3 from moving leftward or rightward inadvertently.

Figure 15:
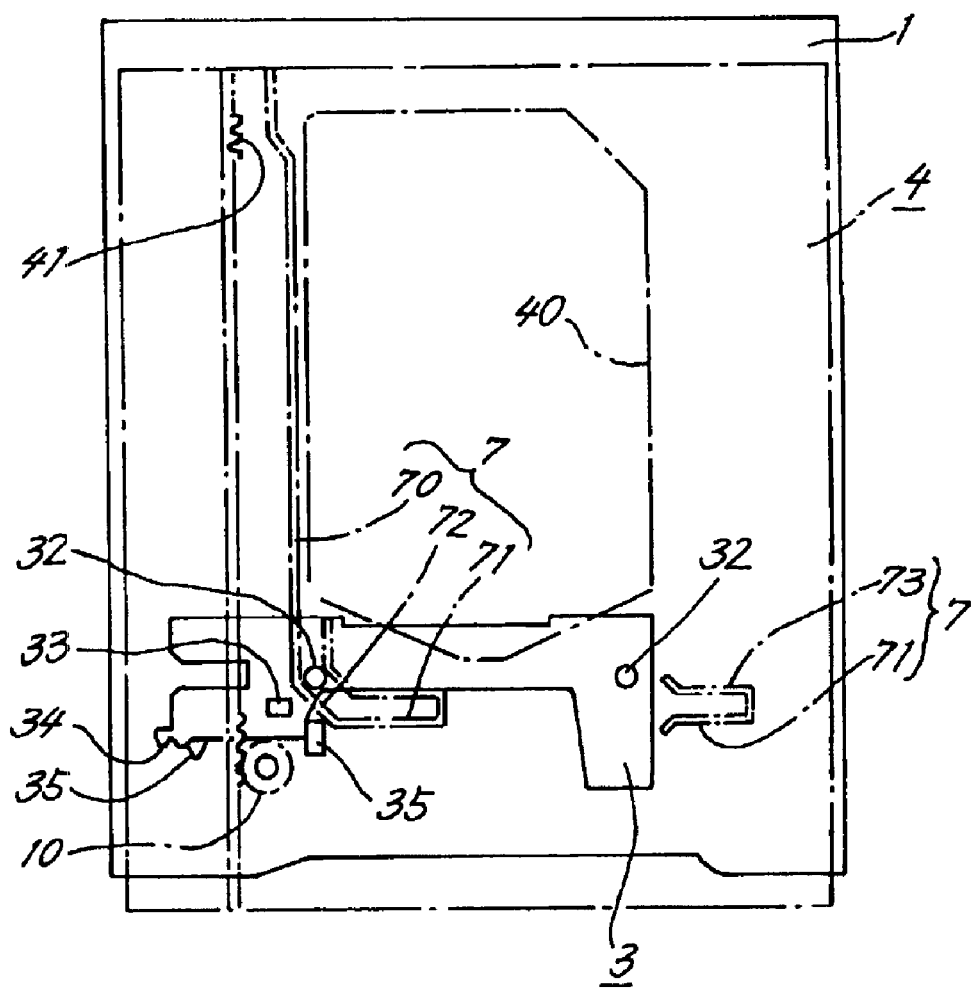
FIG. 15 is a plan view showing the advance movement of the tray.

With a further advance of the tray 4, the inclined wall 72 moves the slide member 3 rightward by pushing the first projection 32 as shown in FIG. 15. The rack 34 of the slide member 3 meshes with the drive gear 10, starting to move the slide member 3.

Figure 16:
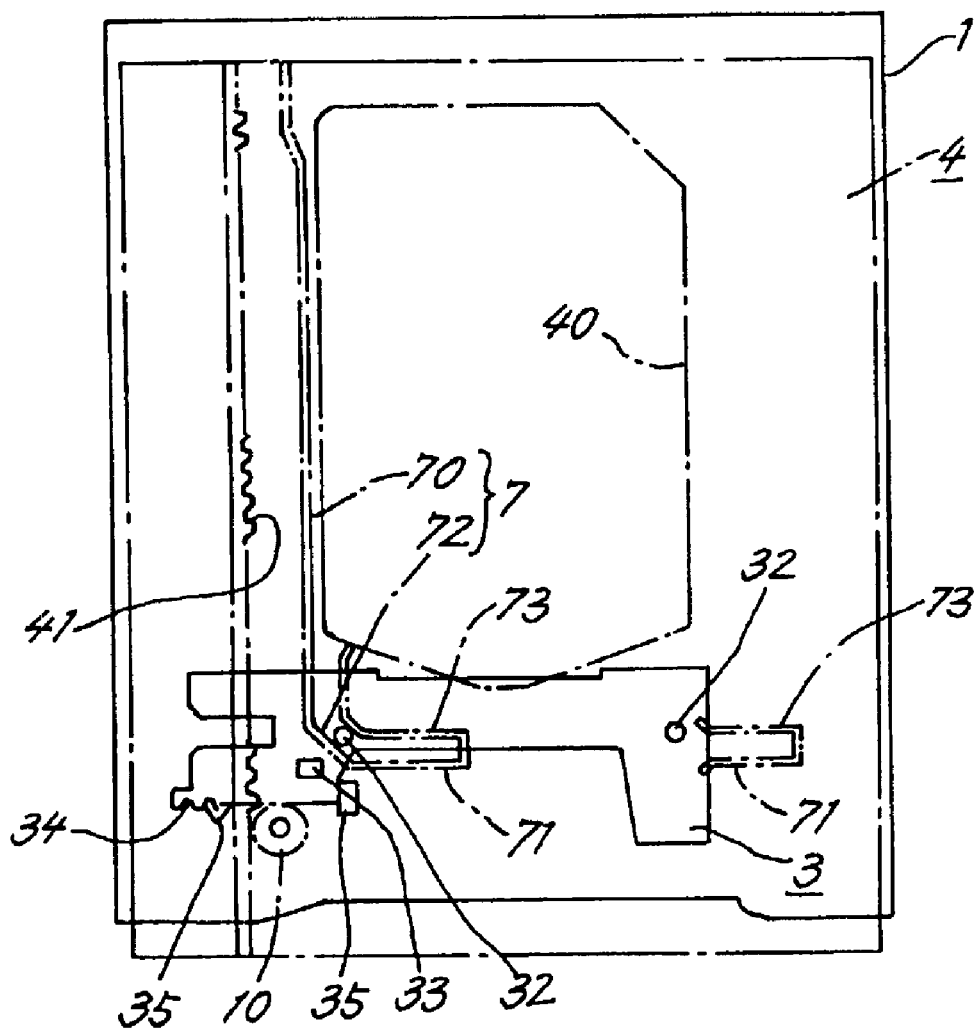
FIG. 16 is a plan view showing the advance movement of the tray.

When the tray 4 further advances, the slide member 3 moves further rightward, causing the first projection 32 at left to push the inclined wall 72 and moving the tray 4 forward as shown in FIG. 16. The rack 41 of the tray 4 moves out of meshing engagement with the drive gear 10.

Figure 17:
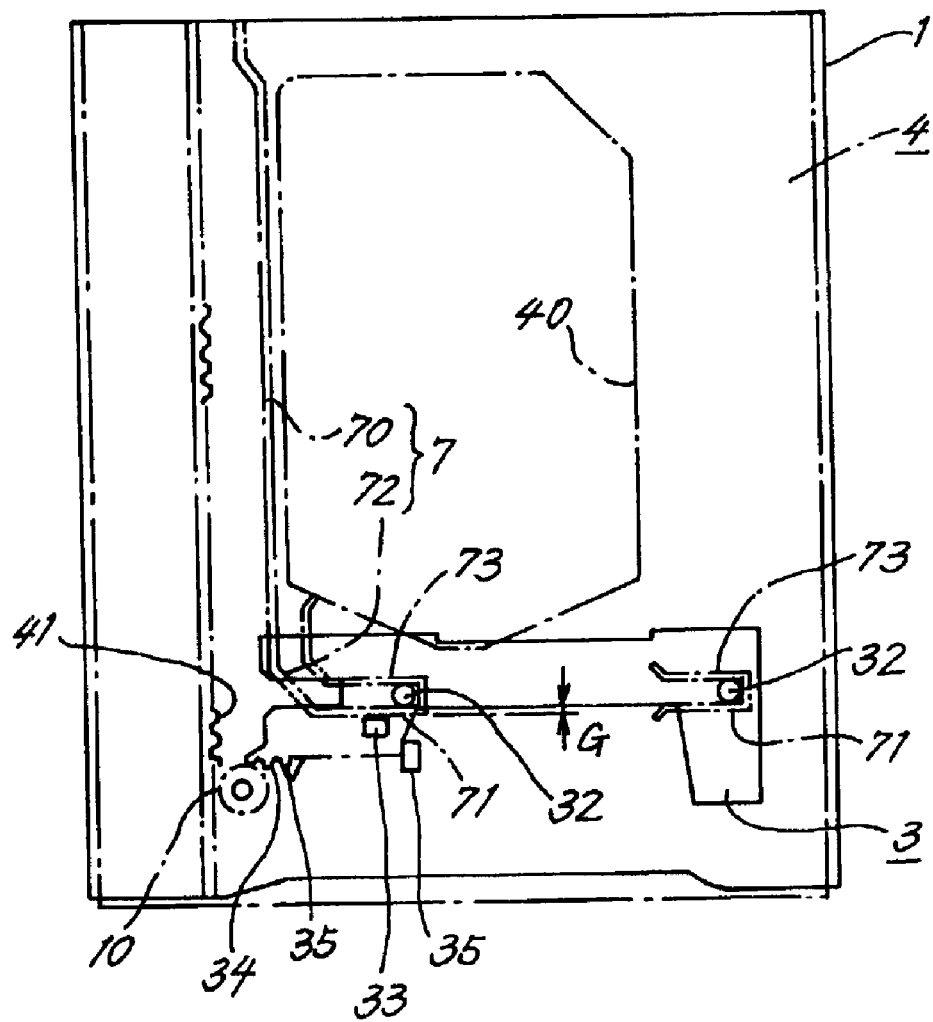
FIG. 17 is a plan view showing the tray on completion of advance.

With the tray 4 completely advanced as shown in FIG. 17, the second wall 71 is fitted in the clearance G between the left first projection 32 on the slide member 3 and the second projection 33. With the tray 4 completely advanced, the second wall 71 is held between the first and second projections 32, 33, and the first projection is held in a groove defined by the second wall 71 and the wall 73, so that even if the device is subjected to an impact, for example, by falling, the load of impact is received by the two projections 32, 33 and the walls 71, 73. Thus, it is thought that the load of impact is received dividedly by the two projections 32, 33 and the two walls 71, 73. This reduces the likelihood of the projection 32 or 33 breaking.

The switch pushing protrusion 35 at the left depresses the sensor switch SW (see FIG. 2), indicating that the tray 4 is in an advance completed position.

(Second Embodiment)

With the foregoing embodiment, the holding piece 15 is leftwardly away from the supporting piece 16 by a distance L1 as shown in FIG. 8. This gives the chassis 1 an increased overall lateral dimension. The present applicant has conceived the idea of providing the holding piece 15 and the supporting piece 16 in a plane M (see FIG. 19) containing the forward or rearward direction and orthogonal to the upper surface of the subchassis 50 so as to eliminate or decrease the lateral distance between the holding piece 15 and the supporting piece 16 and to give a reduced lateral width to the chassis 1.

Figure 18:
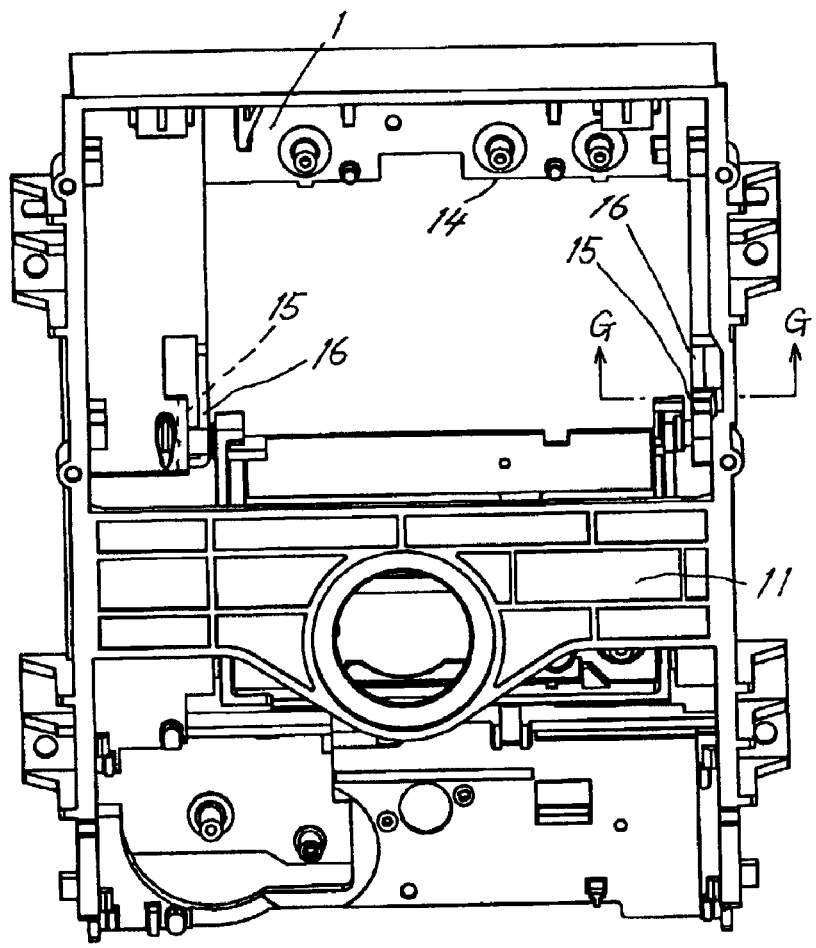
FIG. 18 is a plan view of a chassis according to another embodiment.
Figure 19:
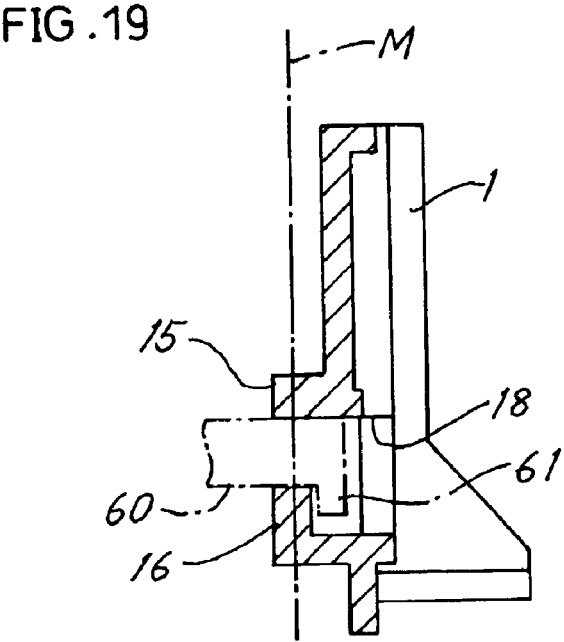
FIG. 19 is a view showing FIG. 18 in section along a plane containing the line G—G.
Figure 20:
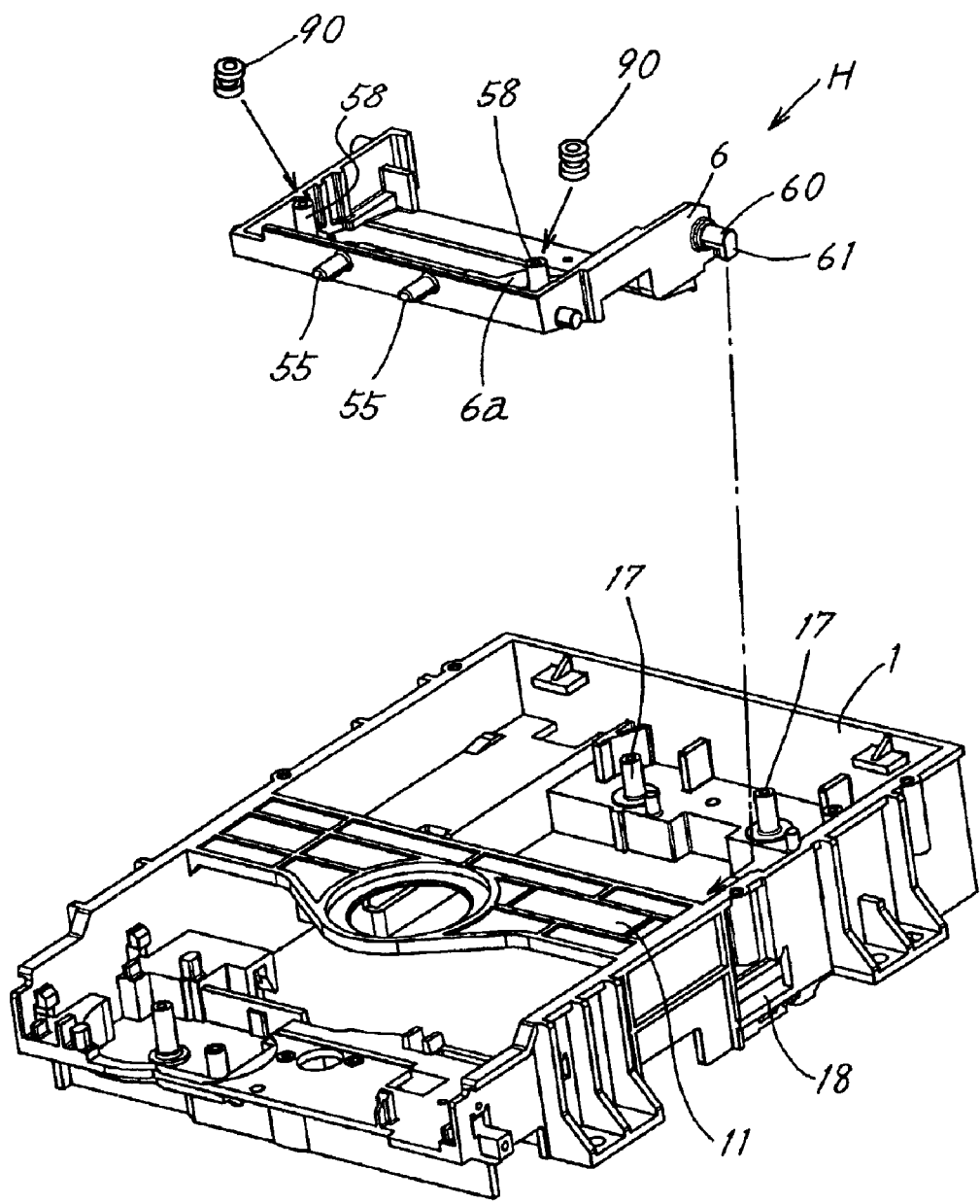
FIG. 20 is an exploded perspective view of the chassis and a frame.

FIG. 18 is a plan view of a chassis 1 according to the present embodiment, FIG. 19 is a view showing FIG. 18 in section along a plane containing the line G—G, and FIG. 20 is an exploded perspective view of the chassis 1 and a frame 6. According to the present embodiment, a mechanism deck 5 comprising a subchassis 50 and a frame 6 attached to the subchassis is mounted also on the chassis 1. For the convenience of illustration, the subchassis 50 is not shown in FIG. 20.

A holding piece 15 and a supporting piece 16 at the right are arranged as aligned vertically within the plane M. The projection 61 of the frame 6 is positioned externally of the supporting piece 16. The difference between the lower face of the holding piece 15 and the upper face of the supporting piece 16 in level is approximately equal to the diameter of the projecting pin 60. This restrains the frame 6 from backlashing upward or downward and backlashing laterally, further reducing the lateral width of the chassis 1.

Although the holding piece 15 and the supporting piece 16 at the right only are vertically aligned in FIG. 18, these pieces 15, 16 at each of the right and left sides may be aligned vertically.

The chassis 1 has a hole 18 formed in the side wall thereof and opposed to the supporting piece 16. The chassis 1 is made from synthetic resin by injection molding as previously described, and the holding pieces 15 and the supporting pieces 16 are formed integrally with the chassis 1. As is well known, molten resin is filled into a space between a fixed mold member and a movable mold member providing a mold to form the chassis 1. After molding, the fixed mold member and the movable mold member are separated from each other vertically. Because the holding piece 15 and the supporting piece 16 are arranged in vertical alignment, the space for the projecting pin 60 to fit in can not be formed between the two pieces 15, 16 when the fixed and movable mold members are merely separated from each other vertically. Accordingly, the hole 18 is formed in the side wall of the chassis 1 to use a slide core (not shown) movable through the hole 18 and form between the holding and supporting pieces 15, 16 a space for the pin 60 to fit in.

Figure 21:
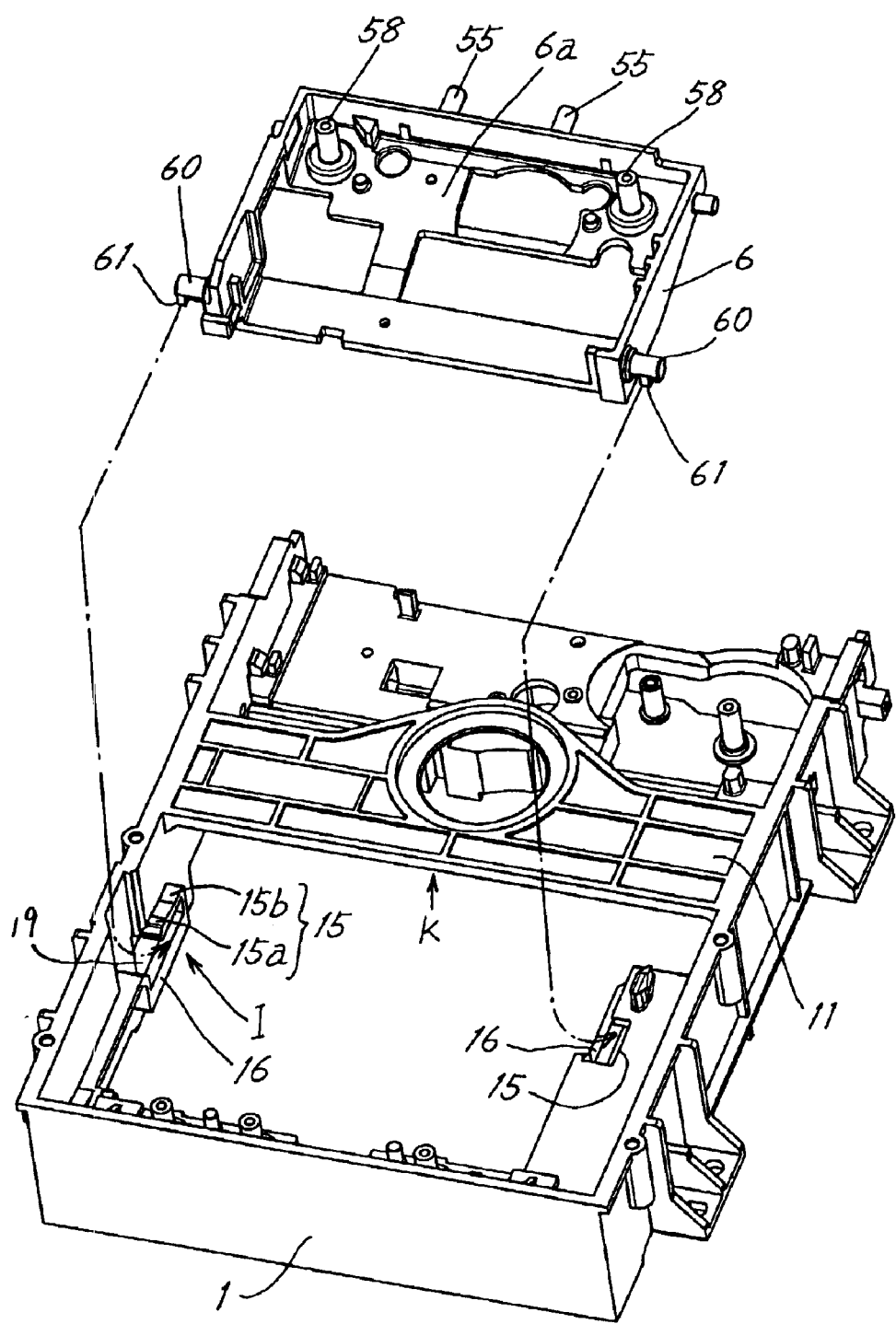
FIG. 21 is a perspective view of the same as seen from the direction H in FIG. 20.
Figure 22:
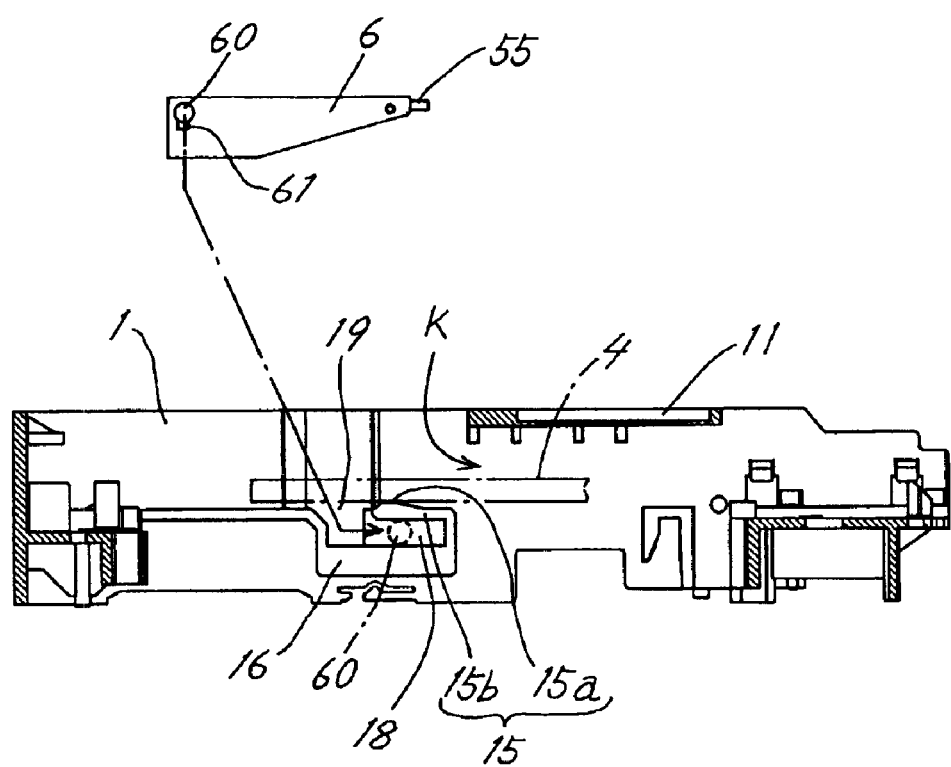
FIG. 22 is a side elevation of FIG. 21 as seen from the direction I.

FIG. 21 is a perspective view of FIG. 20 as the chassis and the frame are seen from the direction H, i.e., FIG. 20 with the front-rear relation thereof reversed. FIG. 22 is a side elevation showing FIG. 21 as these components are seen from the direction I. With the present embodiment, the frame 6 is also inserted into the space K obliquely from above.

The holding piece 16 is opened toward the front as at 19. The projecting pin 60 is inserted into the opened portion 19, thereafter slightly returned rearward and can be held between the holding piece 15 and the supporting piece 16. The upper surface of the holding piece 15 includes a support face 15a for supporting the bottom of the tray 4, and a recessed face 15b lower than the support face 15a and to be out of contact with the tray 4. Thus, the tray 4 is supported by a portion of the holding piece 15.

The tray 4 is not supported by the entire area of the upper surface of the holding piece 15 for the following reason. While the holding piece 15 is formed from synthetic resin integrally with the chassis 1 by injection molding, a warp or sink mark occurs in the upper surface of the holding piece 15 depending on the injection molding conditions. If the upper surface of the holding piece 15 extends horizontally and when the tray 4 is supported by the entire area of the upper surface, it is likely that the sunk portion or warped portion will support the tray 4. Accordingly, a portion of the holding piece 15 is adapted to support the tray 4 to diminish the likelihood that the tray 4 will be supported by the sunk or warped portion.

Especially, the holding piece 15 is positioned slightly forwardly of midportion of the chassis 1 in the front-to-rear direction, so that the tray 4 can be restrained from backlashing immediately before the tray reaches the front end portion of the chassis 1.

What is claimed is:

1. A disk recording or playback device comprising a mechanism deck provided with a turntable and mounted on a chassis upwardly or downwardly movably, a clamp disposed above the turntable for holding a disk D between the turntable and the clamp, a clamp support plate for holding the clamp, and a slide member for moving the mechanism deck upward toward the clamp or moving the deck downward, wherein the mechanism deck comprises a subchassis having the turntable mounted thereon and a frame fitting to the slide member and supporting the subchassis, the clamp support plate being integrally fixed to the chassis, the chassis being provided with a holding mechanism for upwardly or downwardly pivotally movably supporting the frame as the frame is inserted into the chassis obliquely from above and fitting to the slide member, the frame being provided with a pin projecting outward therefrom, the frame being turned about the projecting pin, the center of rotation of the subchassis being apart from the projecting pin.

2. A disk recording or playback device according to claim 1, wherein the frame is provided with a pin projecting outward therefrom and supported by the holding mechanism for restraining the frame from backlashing upward or downward, and the projecting pin has a projection for preventing the frame from backlashing laterally.

3. A disk recording or playback device according to claim 1, wherein the holding mechanism comprises a holding piece in contact with an upper end of the projecting pin and a supporting piece in contact with a lower end of the projecting pin.

4. A disk recording or playback device according to claim 3, wherein the holding piece and the supporting piece are provided in a plane M containing a forward or rearward direction and orthogonal to an upper surface of the subchassis.

5. A disk recording or playback device according to claim 4, wherein a tray for placing the disk D thereon is disposed above the subchassis upwardly or downwardly movably, and the holding piece has an upper surface portion supporting a lower surface of the tray.

6. A process for assembling a disk recording or playback device comprising a mechanism deck provided with a turntable and mounted on a chassis upwardly or downwardly movably, a clamp disposed above the turntable for holding a disk D between the turntable and the clamp, a clamp support plate for holding the clamp, and a slide member for moving the mechanism deck upward toward the clamp or moving the deck downward, wherein the mechanism deck comprises a subchassis having the turntable mounted thereon and a frame fitting to the slide member and supporting the subchassis pivotally movably, a space K being provided between the clamp support plate and the chassis for permitting insertion of the mechanism deck thereinto obliquely from above, the chassis being provided with a holding mechanism thereon for supporting the frame upwardly or downwardly pivotally movably, the frame being provided with a pin projecting outward therefrom, the frame being turned about the projecting pin, the center of rotation of the subchassis being apart from the projecting pin, the clamp support plate being integrally fixed to the chassis, the process comprising the steps of:

inserting the mechanism deck into the space K obliquely from above, causing the holding mechanism on the chassis to support the frame upwardly or downwardly pivotally movably, and fitting the frame as supported by the holding mechanism to the slide member.

* * * * *